United States Patent [19]

Hancock et al.

[11] Patent Number: 4,945,214

[45] Date of Patent: Jul. 31, 1990

[54] DIGITAL DATA APPARATUS WITH DATASTRIP COMPRESSION AND EXPANSION

[75] Inventors: David Hancock; Thomas Bond, both of Rochester, N.Y.

[73] Assignee: Eastman Kodak Company, Rochester, N.Y.

[21] Appl. No.: 138,469

[22] Filed: Dec. 28, 1987

[51] Int. Cl.⁵ .............................................. G06K 7/10
[52] U.S. Cl. .................................. 235/456; 235/436; 235/449; 235/480
[58] Field of Search ............... 235/436, 449, 456, 470, 235/480

[56] References Cited

U.S. PATENT DOCUMENTS

| | | |
|---|---|---|
| 3,158,317 | 11/1964 | Alexander . |
| 3,560,964 | 2/1971 | Bedell et al. . |
| 3,585,612 | 6/1971 | Corbaj et al. . |
| 3,600,557 | 8/1971 | Zappia . |
| 3,700,862 | 10/1972 | Snook et al. . |
| 3,879,693 | 4/1975 | Roscoe et al. ................... 235/456 |
| 4,119,839 | 10/1978 | Beckmann et al. . |
| 4,150,873 | 4/1979 | Dali . |
| 4,247,907 | 1/1981 | Durbeck et al. . |
| 4,279,021 | 7/1981 | See et al. . |
| 4,439,757 | 3/1984 | Gross et al. . |
| 4,568,983 | 2/1986 | Bobick . |
| 4,631,700 | 12/1986 | Lapeyre . |
| 4,634,850 | 1/1987 | Pierce et al. . |
| 4,692,603 | 9/1987 | Brass et al. . |
| 4,695,991 | 9/1987 | Hudson ............................ 235/456 X |

OTHER PUBLICATIONS

Omni-Reader, "O-R/1 User Manual", Oberon International Ltd., 1984, 4 pages.

*Primary Examiner*—David L. Trafton
*Attorney, Agent, or Firm*—William F. Noval

[57] ABSTRACT

Digital data apparatus is programmable by means of digital data encoded on one or more datastrips contained on an application insert. In order to substantially increase the amount of digital data in each datastrip, fixed-length digital data is compressed according to a predetermined compression/decompression code to produce variable length data which are then encoded on the datastrip. The disclosed apparatus minimizes the time required (1) to read the encoded data into the digital data apparatus and (2) to decode the encoded data so that the decoded data can be ready to be used. As disclosed, a reader reads the encoded data into digital memory during one pass of the reader over the length of the datastrip and while the reader returns to its starting position, the encoded data is decoded according to the predetermined code.

5 Claims, 10 Drawing Sheets

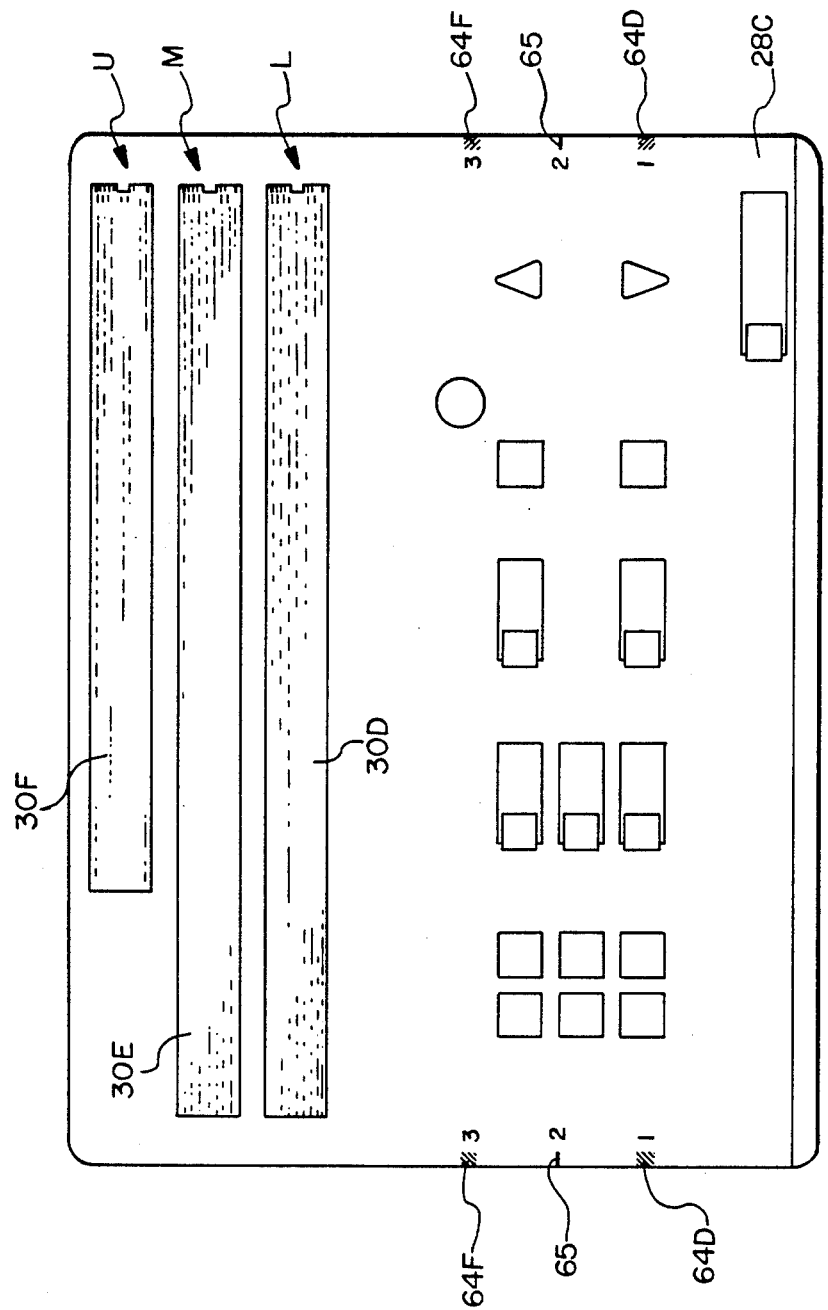

DIGITAL DATA APPARATUS WITH DATASTRIP COMPRESSION AND EXPANSION

BACKGROUND OF THE INVENTION

This invention relates generally to digital data apparatus and more particularly to digital data apparatus which reads and expands compressed digital data contained on datastrips.

Microprocessor controlled equipment utilizing digital data have become commonplace in industry, in business and in the home. In some equipment (such as the microwave oven, or other consumer appliances), programming of the microprocessor is dedicated to the specific control of the equipment. Thus, the microprocessor is not independently programmable by the equipment user. In other equipment (such as home or personal computers), the microprocessor is the heart of a digital data system which may be independently programmed by the user.

Major obstacles to the wider acceptability of user programmable digital data utilization apparatus have been the skill and time required to learn to use such apparatus. Moreover, available software often is expensive (costing several hundred dollars or more), and requires considerable time and effort to master the terminology and routines presented in the software. Typically, the home or personal computer includes a floppy disc drive. The software to be utilized in the computer is encoded on a floppy disc which is inserted into the floppy disc drive of the computer. Although versatile, such a programming system is expensive and requires skill to implement.

Other systems have been proposed for making microprocessor controlled apparatus more flexible and capable of performing a variety of functions through the use of interchangeable keyboard overlays, digital cartridges and the like. (See, for example, U.S. Pat. Nos. 4,439,757 and 4,119,839) Such systems are disadvantageous because, by separating the keyboard overlay from the data cartridge, one or the other may be lost, rendering the system useless. Moreover, the data cartridges or cassettes are expensive.

Another system which has been proposed for increasing the versatility of digital data apparatus is to provide a dedicated keyboard with a limited number of keys, but to store within the apparatus, software programming for different functions for each key relating to several different applications. Interchangeable keyboard overlays are then placed over the keyboard to provide visual indicia of the functions of the keys for a specific application. The keyboard overlays may also include machine readable codes or memory chips. These systems have limited flexibility and are costly and complex. (Such systems are disclosed, for example, in U.S. Pat. No. 3,158,317 entitled CONTROL DEVICE, isussed Nov. 24, 1964; U.S. Pat. No. 3,560,964 entitled KEYBOARD UNIT, issued Feb. 2, 1971; and U.S. Pat. No. 4,279,021 entitled PROTABLE DATA ENTRY APPARATUS INCLUDING PLRUAL SELECTABLE FUNCTIONAL CONFIGURATIONS, issued Jul. 14, 1981)

Another programming system is disclosed in U.S. Pat. No. 4,631,700, entitled MAGNETICALLY CODED SOFTWARE FOR MULTIPURPOSE COMPUTER, issued Dec. 23, 1986, filed Aug. 11, 1983. As disclosed in this patent, a computer keyboard matrix overlay panel includes magnetic and optical datastrips which contain data program steps and subroutines which are read into the digital data device by a reader. In digital data apparatus which are programmable by means of digital data rad from magnetic or optical datastrips contained on replaceable keyboard overlays or the like, it is desirable that the amount of digital data contained in a datastrip be maximized. Thus, more complex programs or larger amounts of data can be provided to the digital data apparatus. It is also desirable that the time required to read the data into the apparatus be minimized, so that the digital data read into the apparatus can be ready for use as quickly as possible.

SUMMARY OF THE INVENTION

According to the present invention, there is provided digital data apparatus which is programmable by means of compressed digital data read from one or more datastrips contained on an application insert which preferably contains a keyboard overlay associated with using such digital data. The digital data apparatus includes digital memory and a reader which reads compressed digital data from a datastrip into the memory while the reader traverses the length of the datastrip in a first direction. After all the encoded (compressed) data has been stored in memory, the reader reverses direction and returns to a starting position. During this interval, the encoded data is decoded according to a predetermined compression/decompression code and the decoded data is stored in memory. According to an aspect of the invention, key variable data, useful in decoding the encoded data, are encoded in a header at the beginning of a datastrip. If two or more datastrips are to be read in sequence, the key variable data is encoded in a header on the first datastrip and are retained in memory to be used in decoding data encoded on subsequent datastrips.

DESCRIPTION OF THE DRAWINGS

The invention will be described in detail with reference to the drawings in which like elements are provided with like numbers.

FIGS. 3A, 3B and 3C are plan views of application inserts useful in describing the present invention;

DESCRIPTION OF THE PREFERRED EMBODIMENT

The present invention will be described with respect to a digital data apparatus which is intended to be an information appliance for the consumer market. It will be understood that the present invention may also be used with other digital data apparatus. In general, the information appliance described below includes a microprocessor and memory for storing software relating to operating system routines and built-in application routines. The appliance can also process a wide variety of customized software applications which are provided on application inserts which have an application program in machine readable digitally encoded datastrips. The application insert also includes a touchpad to interface the user with the software application. The machine readable digitally encoded format of the datastrips is preferably one in which the datastrips include a structured pattern of black and white adjacent rectangles which are encoded with the application software and which are read by means of mechanical or electronic, optical scanning devices. It will be understood, however, that other optical and magnetic digital data formats may be used with the present invention.

Figure 1:
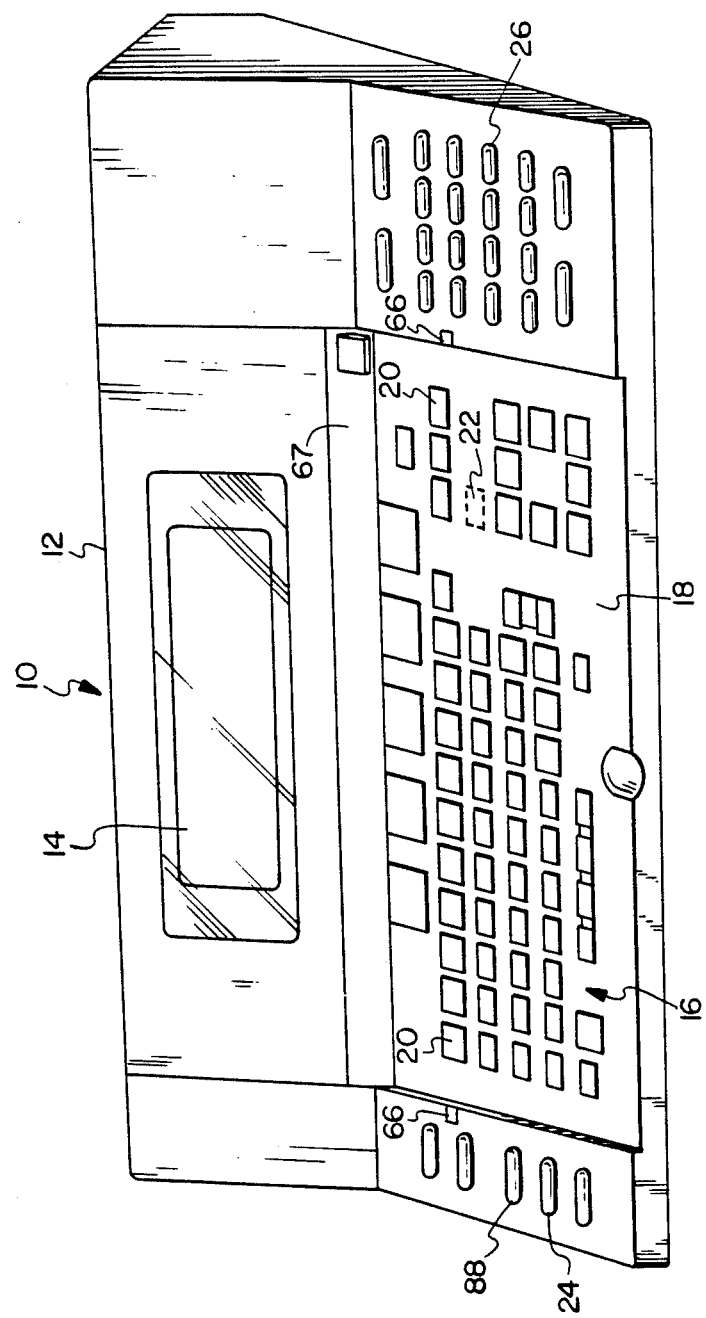
FIG. 1 is a perspective view of a digital data apparatus including an embodiment of the present invention.

Referring now to the Figures, there will be described a preferred embodiment of the present invention. As shown in FIG. 1, a digital data apparatus such as information appliance 10, includes a housing 12 having a liquid crystal display 14. A membrane touchpad 16 is disposed in a recess 18 in housing 12. Touchpad 16 includes an array of touch sensitive keys 20 and touch sensitive positions 22 which may be configured into an application specific touchpad when an application insert is placed over touchpad 16. Keys 20 are visually marked with a full typewriter keyboard and with other keys to access and use software applications built into appliance 10. Appliance 10 is also provided with control keys 24 and arithmetic keys 26.

Figure 2:
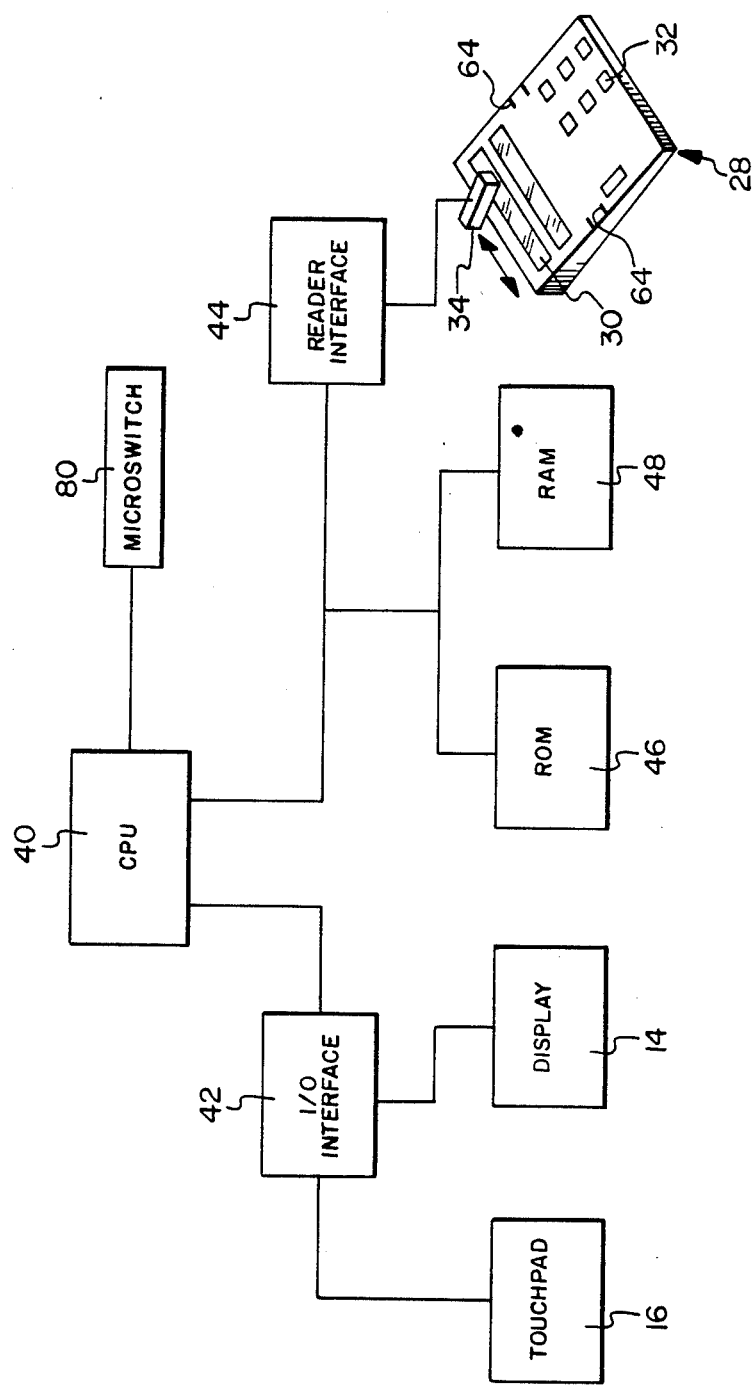
FIG. 2 is a block schematic diagram useful in describing the operation of the apparatus of FIG. 1.
Figure 5A:
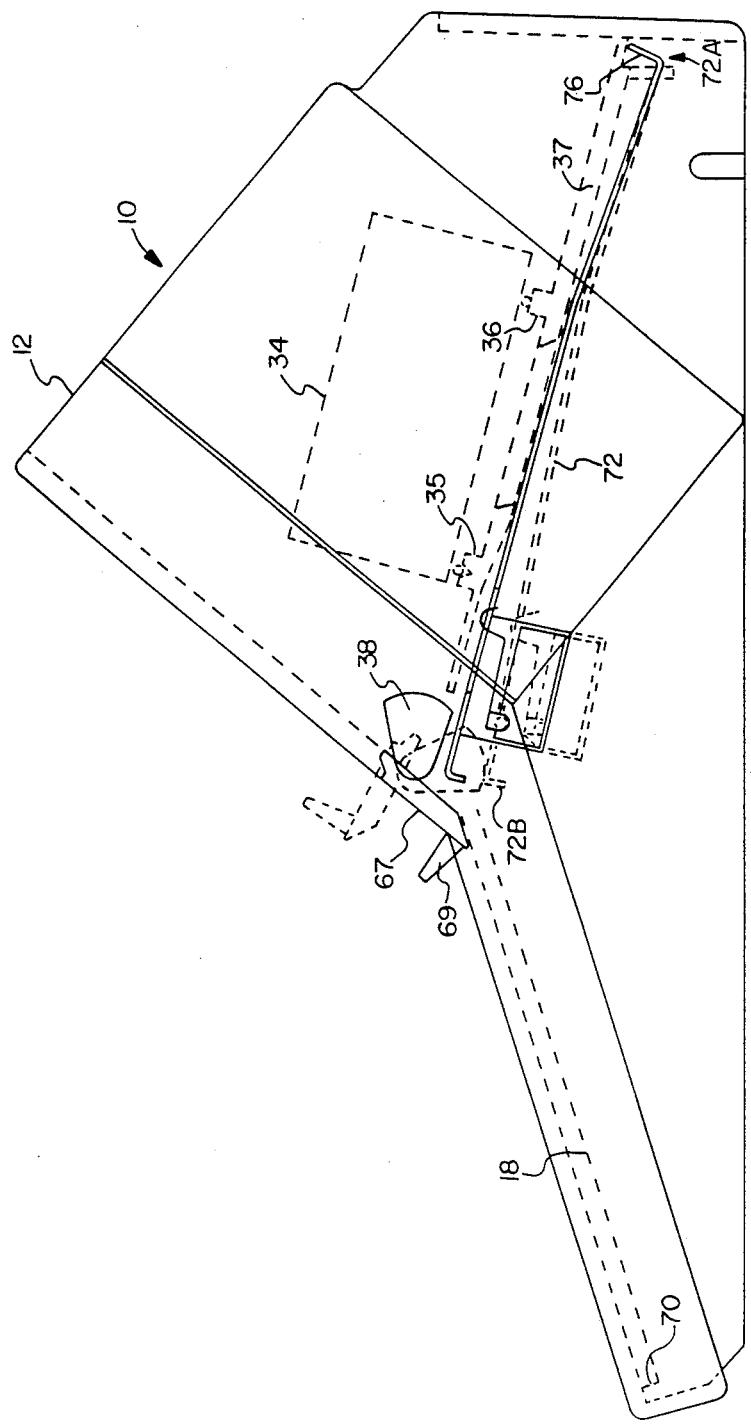
FIGS. 5A and 5B are diagrammatic, elevational and plan views illustrating components of the apparatus of FIG. 1.

An application insert 28 (FIG. 2) contains one or more datastrips 30 having digital data encoded in machine readable format. Insert 28 also has an overlay touchpad 32 having keys which overlay touch sensitive positions on touchpad 16 of appliance 10. Appliance 10 includes a datastrip reader 34 which is mounted for reciprocal movement on tracks 35 and 36 on fixed member 37 (FIG. 5A). A pressure platen 72 is located below member 37 and is cantilevered at end 72A by bracket 39 of member 37. Free end 72B of platen 72 is movable between open and closed position by means of cam 38 on door 67. When door 67 is opened (by pushing up on lever 69), end 72B is cammed down by cam 38 (as shown in dashed lines in FIG. 5A). An application insert 34 may now be placed onto platen 72 to position a datastrip relative to reader 34. When door 67 is closed (by pushing down on lever 69), cam 38 is raised, allowing platen 72 to press the insert against member 37 so that the datastrip is in the field of focus of reader 34.

Reader 34 can be a mechanical-optical reader which optically scans a datastrip and translates its contents into digitally coded signal which is stored in memory in appliance 10. (It will be understood that reader 34 may also be an electronic optical reader which includes an array of photodiodes or a CCD sensor.) Datastrips 30 may also be in the form of magnetic media, in which case, the reader 34 can be any well known type of magnetic scanning device.

The digital data processing system (FIG. 2) of appliance 10 includes a microprocessor central processing unit (CPU) 40 which is connected to touchpad 16 and display 14 by input/output (I/O) interface circuit 42. CPU 40 is linked to read only memory (ROM) 46; random access memory (RAM) 48 and to datastrip reader 34 by means of reader interface circuit 44. ROM 46 contains software programs (1) relating to the operating system for the microprocessor (CPU 40) and (2) relating to application functions which are built into appliance 10. RAM 48 has sufficient memory for storing applications and data read from application inserts 28 as well as data associated with the programs stored in ROM 46.

Figure 3A:
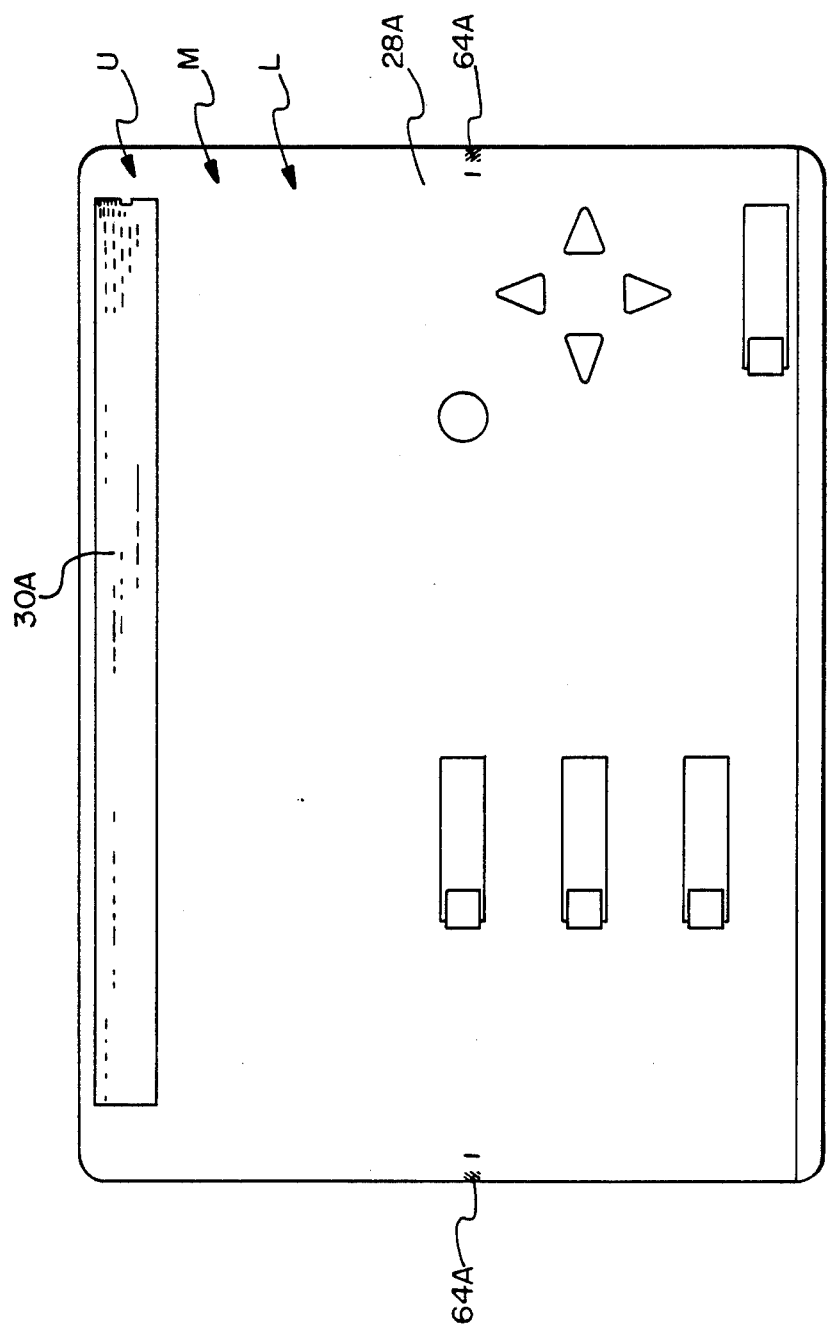
Figure 3B:
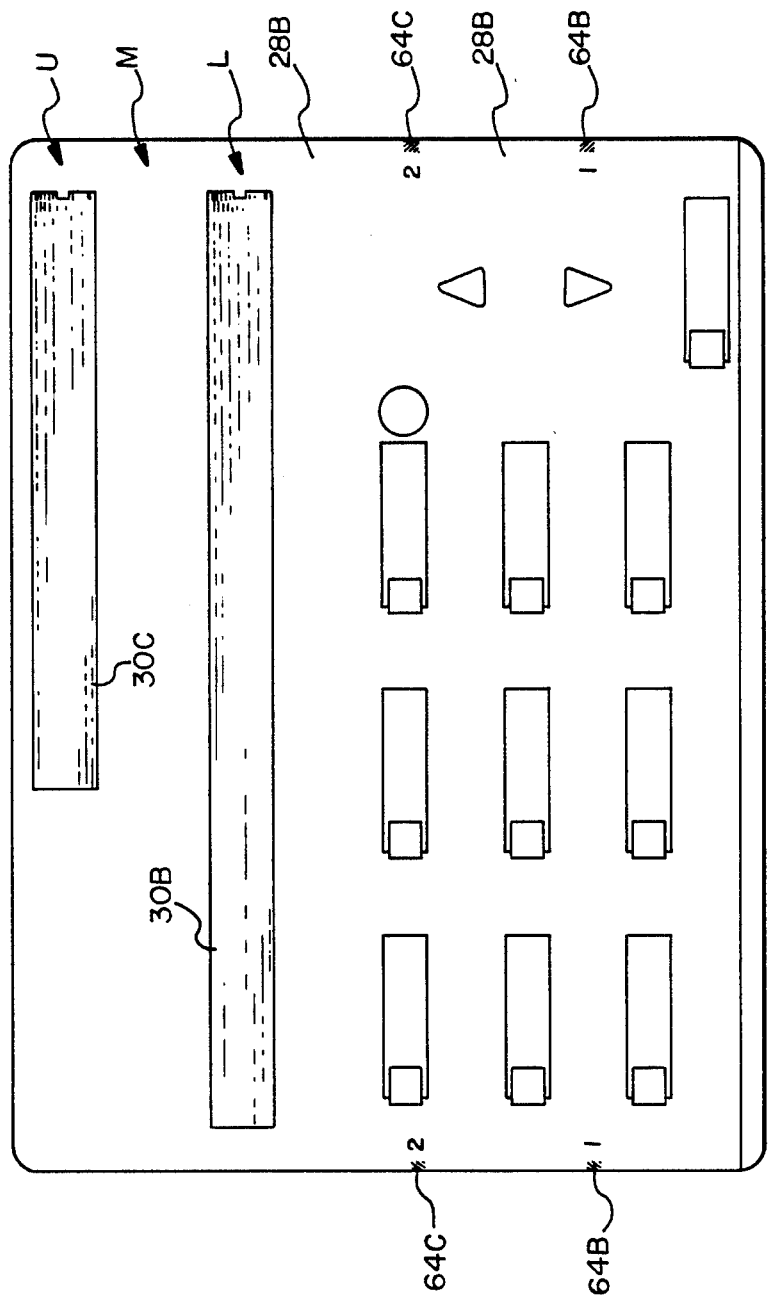

As illustrated in FIGS. 3A-3C, the location of a datastrip or datastrips on an application insert is preferably a function of the number of datastrips on the insert. The location of a datastrip is chosen so that when the last datastrip is positioned relative to the datastrip reader, the touchpad of the application insert overlays the membrane touchpad of appliance 10. As shown, the application insert 28 has a datastrip region for locating three datastrips 30. The region includes an upper location designated U, a middle location designated M, and a lower location designated L. When the application insert (such as insert 28B in FIG. 3B) has two datastrips to be read in sequence, the first datastrip (30B) is located in the L (lower) location and the second or last datastrip (30C) to be read is located in the U location. This is to be compared with the application insert of FIG. 3A wherein the first and only datastrip is located in the U location. When the application insert (such as insert 28C in FIG. 3C) has three datastrips to be read in sequence, the first datastrip (30D) is located in the L location; the second datastrip (30E) is located in the M location; and the third datastrip (30F) is located in the U location. Application inserts 28A C are also provided with guidance marks 64 (such as 64A FIG. 3A; 64B, 64C FIG. 3B and 64D, 64G FIG. 3C) and alignment marks 65 (FIG. 3C) which may be aligned with corresponding marks 66 on appliance 10 to guide a user to properly position a datastrip for reading by reader 34. The user is preferably guided by messages displayed on the display 14.

Figure 4A:
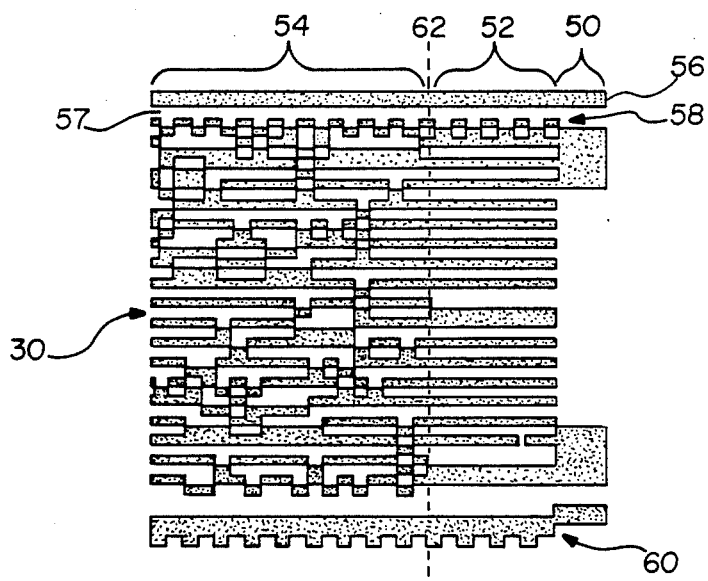
FIGS. 4A and 4B are diagrams illustrating one format of digitally encoded machine readable data useful in the present invention.
Figure 4B:
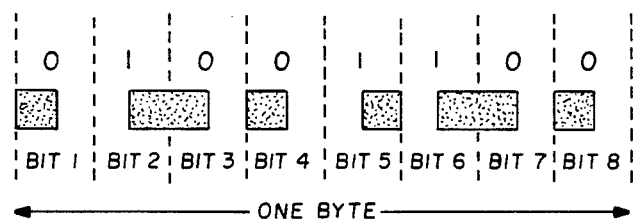

Referring now to FIGS. 4A and 4B, there will be described one format for the optically readable digitally encoded data on the datastrips. This is an encoded pattern in which a data bit is defined by dibits, wherein a "zero" is define by sequential black and white squares and a "one" is defined by sequential white and black squares. The encoded digital information is in a plurality of parallel, contiguous lines formed of identical number of bits of information, the bits being of uniform height and width. The bits may be encoded so that fixed length or variable length bit sequences represent a character of information. For example, a fixed length eight bit (byte) ASCII code may be used or, (as will be explained in greater detail below) a variable length compressed code may be used. Associated with the encoded information on the printed datastrip, are printed areas serving to preliminarily align the optical reader with the data lines, to maintain that alignment during reading, and to set the vertical and horizontal rates of scanning.

As shown in the exemplary portion of a datastrip in FIG. 4A, the datastrip 30 is oriented to be read by the reader 34 from right to left. The datastrip 30 includes a header portion including a tilt adjustment section 50 and a vertical synchronization section 52 followed by an encoded information section 54. Running along the top edge of the datastrip is a solid start line 56, one dibit wide. After a one bit space 57, there follows a checkerboard pattern alignment guideline 58, which functions as a tilt control line. Running longitudinally along the lower edge of the datastrip 30 is patterned alignment guideline 60. Alignment guidelines 58 and 60 enable the reader 34 to adjust the angle of scanning relative to a transverse data line 62 to the extent necessary to keep them parallel as the datastrip is read.

Figure 5B:
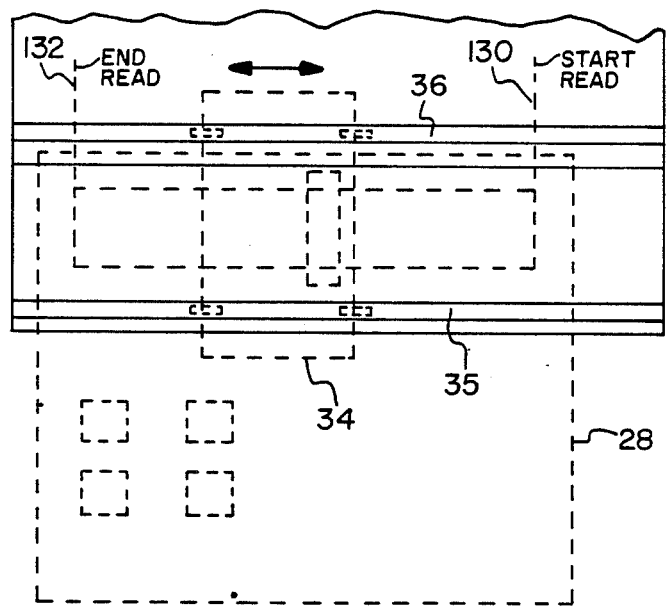

As shown in FIG. 5B, reader 34 starts reading a datastrip at the "start read" position 130. Reader 34 moves in a first direction along tracks 35 and 36 from right to left until the "end read" position 132 is reached. At this point, all of the data on the datastrip has been read into RAM 48 and reader 34 is moves in a second, opposite direction to the "start read" position, to be ready to read another datastrip.

Referring now to FIG. 4B, there is shown in greater detail an exemplary byte of dibit encoded digital data (where a fixed length code is used). As shown, the byte has the value 01001100. Thus, bits 1, 3, 4, 7, and 8 are "zero" bits and are defined by black followed by white squares. Bits 2, 5, and 6 are "one" bits and are defined by white followed by black squares. The number of bytes in a datastrip may vary, for example, from two to eight bytes or more and in the example given in FIG. 4A, comprises two bytes, whereas the datastrips illustrated in FIGS. 3A 3C have data lines which are six bytes wide (i.e., 48 bits wide). It will be understood that the data lines may comprise any number of bits or bytes.

According to the present invention, the data encoded in a datastrip is compressed by means of a data compression/decompression code to increase the effective amount of data contained on a datastrip. ROM 46 stores a program loader routine which includes the decompression algorithm. Prior to initiation of the reading of data, the program loader routine is written into RAM 48. Then, the compressed data on a datastrip is read from the datastrip by reader 34 into a buffer in reader interface 44. The program loader moves the encoded data from the buffer into RAM 48 as reader 34 moves along the length of a datastrip (FIG. 5B). After all the information of a compressed datastrip has been read into RAM 48, the deompression algorithm is called by the program loader and the data is decoded as the reader 34 returns to its starting position. As the data is decoded, it is stored in RAM 48. After the data has been decoded, the decompression algorithm retains its key variable values and returns control to the program loader. The key variable values must be retained due to the fact that the last bits of encoded data on a datastrip may not contain enough information to be decoded into a byte value. As an example, a variable length character may have three bits, two bits contained in the last line of the first datastrip and the third bit in the first line of the next datastrip. When the second datastrip is decoded, the three bits will be combined and decoded as a byte length character.

Suitable codes for compressing and decompressing fixed length digital data are variable length frequency based codes such as "Huffman" codes or such as the modified "Elias" source coding scheme described in the article "An Efficient Coding System for Long Source Sequences", by C. B. Jones, IEEE Transactions On Information Theory, Vol. IT 27, No. 3, May, 1981, pp. 280-291. For example, a fixed length eight bit ASCII code may be compressed into one half or less of the normal number of bits by means of one of these compression codes. Thus, two or more times the amount of digital data may be encoded on each datastrip, so that more data and more complex programs may be encoded on an application insert. Since the compressed data is decoded during the interval during which the reader 34 returns to its starting position, the time required for the decoding process results in little or no delay before reader 34 is ready to read the next datastrip.

Figure 6:
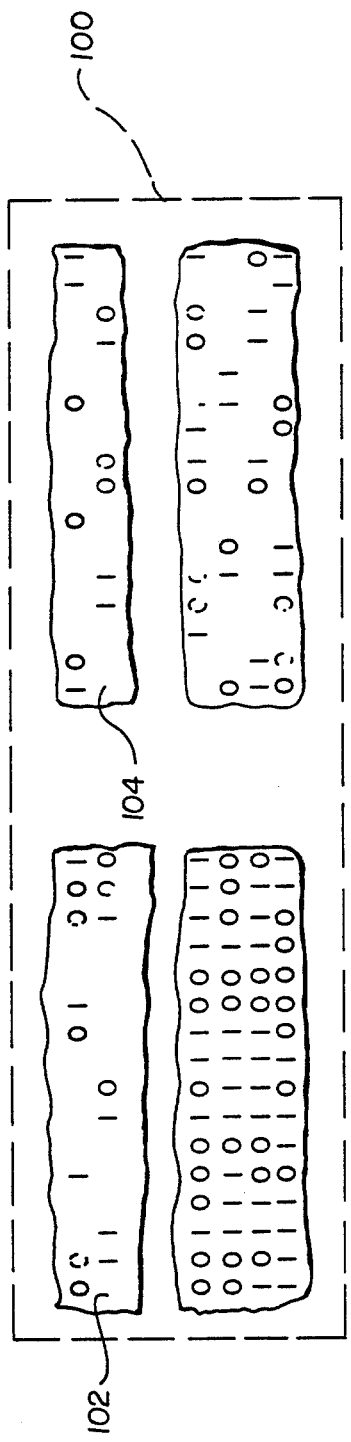
FIGS. 6–8 are diagrams useful in explaining the present invention.
Figure 7:
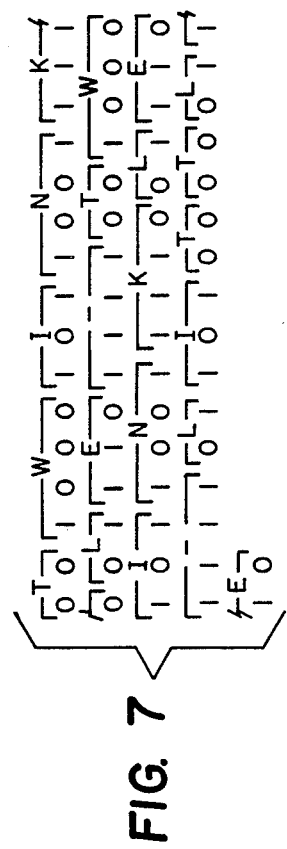

The invention will now be described in greater detail with reference to FIGS. 6-8. FIG. 6 diagrammatically illustrates a portion of an application insert 100 having datastrips 102 and 104 which are comprised of lines of digital data two bytes wide. A simple message "TWINKLE TWINKLE LITTLE" has been compressed by means of a Huffman algorithm into a sequence of sixty-six binary bits which comprise the last four lines of datastrip 102 and the first two bits of the first information line of datastrip 104. If this message were encoded in a fixed length eight bit ASCII code, it would require twenty two bytes (20 letters and two spaces) or eleven lines of a datastrip to contain it.

TABLE 1

CODE TABLE

| Character | Bits | | | |
|---|---|---|---|---|
| — | 1 | 1 | 1 | 1 |
| E | 1 | 1 | 0 | |
| I | 1 | 0 | 1 | |
| K | 1 | 1 | 1 | 0 |
| L | 0 | 1 | | |
| N | 1 | 0 | 0 | 1 |
| T | 0 | 0 | | |
| W | 1 | 0 | 0 | 0 |

TABLE 2

OCCURENCE TABLE

| Character | Frequency |
|---|---|
| — | 2 |
| E | 3 |
| I | 3 |
| K | 2 |
| L | 4 |
| N | 2 |
| T | 4 |
| W | 2 |

Table 1 lists the compressed code words (sequence of bits) for each letter and space of the exemplary message. The number of bits for each letter is chosen so that commonly occuring letters are represented by a smaller number of bits while infrequent letters are represented by codewords with larger number of bits. Table 2 is an occurrence table for the exemplary message and lists the frequency of occurrence of each letter contained in the exemplary message. Thus, the letters "L" and "T" occur most frequently (4 times each) and are encoded with the smallest number of bits (two) each (FIG. 7). Since most of the characters (letters, numbers, etc.) do not occur in the exemplary message, no codeword is assigned to them.

Figure 8:
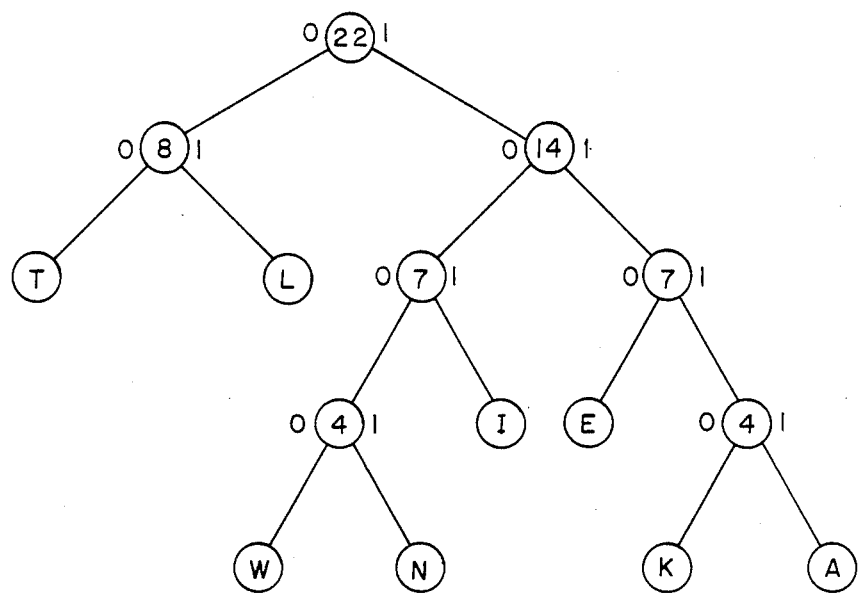

In order to decode the encoded message, a decode tree (such as shown in FIG. 8) is required. The decode tree, along with the code table (Table 1), is encoded in the header of the first datastrip in a sequence of datastrips. Reader 34 reads this header and stores it in RAM 48 to be recalled during the decode process. The decode tree is a composite of every character in the exemplary message and has an occurrence count equal to the number of characters in the original message.

Decoding is effected by starting at the top of the tree and examining the first bit in the compressed message. If it is a 0, move down the tree to the left, if it is a 1 move down the tree to the right. The first bit is "0", so the decode routine branches to the left. The second bit is a "0" and by branching to the left again a leaf node of the tree is reached, the letter "T". By following the same decode routine for each letter, the compolete message can be decoded. Since the end of each letter is exactly decoded by moving down the decode tree, there is no need for a distinctive separator between letters. FIG. 7 shows the bit sequence of FIG. 6 bracketed to indicate the code words for each letter.

After the datastrip 102 has been decoded the last two bits remain to be decoded. They are stored in RAM 48 until datastrip 104 has been comletely read and stored in RAM 48. The decode algorithm then decodes these two bits, in combination with the first bit read from datastrip 104, as the character "E" (see FIG. 7).

The invention has been described in detail with particular reference to a preferred embodiment thereof but it will be understood that variations and modifications can be effected within the spirit and scope of the invention.

What is claimed is:

1. Digital data apparatus comprising:

means for defining an elongated reading station at which one or more datastrips containing related digital information are to be read in sequence, each of said datastrips being formed of compressed, digitally encoded data in a plurality of parallel, contiguous lines of sequential bits, wherein the aggregate of said lines constitute the length of said strip and said lines run transversely of said strip, and wherein the number of bits in each line is identical but the number of bits encoding a character is variable in accordance with a predetermined compression/decompression code;

a datastrip reader which is mounted for movement along said reading station from a start position, in a first direction, to sequentially read said encoded bits in each line of said datastrip until all of said lines have been read and in a second opposite direction to return said reader to said start position;

a digital memory; and control means for storing in said digital memory the encoded bits read from a datastrip by said reader as it moves in said first direction, until all of the bits of a datastrip have been stored in said memory; and while said reader moves in said second direction back to said start position, for decoding said encoded data according to said predetermined compression/decompression code and for storing said decoded data in said memory.

2. The apparatus of claim 1 including means for supporting an application insert containing one or more datastrips adjacent to said reading station for reading by said reader.

3. The apparatus of claim 1 wherein the first datastrip to be read include a header portion which includes key variable parameters used in decoding said encoded data read from said datastrip.

4. Digital data apparatus comprising:

means for defining a reading station;

means for supporting an application insert containing one or more spaced datastrips to be read in sequence at said reading station, each of said datastrips being formed of compressed digitally encoded data in a plurality of parallel, contiguous lines of sequential bits, wherein the aggregate of said lines constitute the length of said strip and said lines run transversely of said strip and wherein the number of bits in each line is identical but the number of bits encoding a character is variable in accordance with a predetermined compression/decompression code;

a digital memory;

a datastrip reader which is mounted for movement in first and second opposite directions along said reading station, wherein, as said reader moves in said first direction, it reads encoded data from said datastrip into said digital memory until all of said data in a datastrip has been read into said memory; and microprocessor control means for decoding according to said compression/decompression code said encoded data stored in said digital memory during movement of said reader in said second direction and for storing said decoded data in said digital memory.

5. The apparatus of claim 4 wherein said application insert contains first and second datastrips; wherein key variable data useful in decoding the encoded data, is encoded at the beginning of the first datastrip to be read; and wherein said key variable data is retained in said memory, after said first datastrip has been read, in order that it may be used in decoding the encoded data read from said second datastrip.

* * * * *